(12) United States Patent
Elangovan et al.

(10) Patent No.: US 7,258,820 B2
(45) Date of Patent: Aug. 21, 2007

(54) CERAMIC MIXED PROTONIC/ELECTRONIC CONDUCTING MEMBRANES FOR HYDROGEN SEPARATION

(75) Inventors: Singaravelu Elangovan, Sandy, UT (US); Balakrishnan G. Nair, Sandy, UT (US); Troy A. Small, Midvale, UT (US)

(73) Assignee: Ceramatec, Inc., Salt Lake City, UT (US)

(*) Notice: Subject to any disclaimer, the term of this patent is extended or adjusted under 35 U.S.C. 154(b) by 350 days.

(21) Appl. No.: 10/708,475

(22) Filed: Mar. 5, 2004

(65) Prior Publication Data

US 2005/0194571 A1    Sep. 8, 2005

(51) Int. Cl.
*H01B 1/08* (2006.01)

(52) U.S. Cl. .............................. 252/518.1; 252/521.1; 252/520.5; 95/55

(58) Field of Classification Search ................ 252/500, 252/518.1, 521.1, 520.5; 423/593.1; 95/55
See application file for complete search history.

(56) References Cited

U.S. PATENT DOCUMENTS

| | | | |
|---|---|---|---|
| 4,879,016 A | 11/1989 | Joshi | |
| 5,021,137 A | 6/1991 | Joshi et al. | |
| 5,378,345 A | 1/1995 | Taylor et al. | |
| 5,478,444 A | 12/1995 | Liu et al. | |
| 5,616,223 A | 4/1997 | Shen et al. | |
| 5,670,270 A * | 9/1997 | Wallin ......................... | 429/33 |
| 5,868,918 A | 2/1999 | Adler et al. | |
| 6,235,417 B1 | 5/2001 | Wachsman et al. | |
| 6,296,687 B2 | 10/2001 | Wachsman et al. | |
| 6,569,226 B1 | 5/2003 | Dorris et al. | |

OTHER PUBLICATIONS

Kuenstler et al "Physical-chemical investigations on Gd-, Eu- and In-doped BaCeO3 ceramics", High Temperature Electrochemistry: Ceramics and Metals, Proceedings of the Risoe International Symposium on Materials Science, 17th Roskilde, Den., Sep. 2-6, 1996, 325-330. (abstract).*

Sharova et al "Electroconductivity and Ion Transport in Protonic Solid Electrolytes BaCe0.85R0.15O3-<SYM100>, where R is a Rare-Earth Element BaCe0.85R0.15O3-<SYM100> (R = La Pr Nd Sm Eu Gd Dy Ho Y Er Tm Yb Lu Sc La)" Russian Journal of Electrochemistry (Translation of Elektrokhimiya) (2003), 39(5), 461-466.*

Balachandran et al "Development of mixed-conducting oxides for gas separation", Solid State Ionics 108 (1998) 363-370.*

Kopec, Mark, "Written Opinion of the International Searching Authority", PCT/ISA/220, (2006) 1-7.

* cited by examiner

*Primary Examiner*—Mark Kopec
(74) *Attorney, Agent, or Firm*—David Fonda

(57) ABSTRACT

A multi-phase mixed protonic/electronic conducting material comprising a proton-conducting ceramic phase and an electron conductive ceramic phase. Under the presence of a partial pressure gradient of hydrogen across the membrane, a membrane fabricated with this material selectively transports hydrogen ions through the protonically conductive ceramic phase and electrons through the electronically conducting ceramic phase, which results in ultrahigh purity hydrogen permeation through the membrane. The material has a high electronic conductivity and hydrogen gas transport is rate-limited by the protonic conductivity of the material.

53 Claims, 3 Drawing Sheets

CERAMIC MIXED PROTONIC/ELECTRONIC CONDUCTING MEMBRANES FOR HYDROGEN SEPARATION

BACKGROUND OF INVENTION

1. Technical Field

This invention relates to a two phase hydrogen permeation membrane that is constructed by combining a perovskite type oxide material as primarily a proton conducting phase and a ceramic oxide phase that exhibits significant electrical conductivity resulting in a composite ceramic material that is a mixed proton/electronic conductor that can be used in a pressure driven hydrogen purification/separation process.

2. Background Art

A variety of metallic, ceramic and polymer membranes have been used for $H_2$ separation from gas streams. The most common metallic membrane materials are palladium (Pd) and palladium alloys (see, for example, U.S. Pat. Nos. 6,066,592 and 5,652,020). However, these materials are unsuitable for $H_2$ separation from raw syngas due to the fact that they are poisoned by hydrocarbons at concentrations as low as 0.5 parts per million (ppm). Further, oxygen concentrations higher than 50 ppm can lead to the catalytic oxidation of hydrogen to water in the presence of Pd, resulting in localized hot spots and premature failure of these membranes. A number of organic membranes (e.g. Nafion) have also been identified as protonic conductors, but these are for lower temperature applications (less than 150° C.) and even at those temperatures are severely degraded by CO gas.

In recent years ceramic membranes have been investigated for use in purifying hydrogen gas from gas streams such as syngas. For example, U.S. Pat. No. 5,387,330 by Taniguchi et al. has shown that perovskite type oxides such as $BaCe_{1-x}M_xO_3$, where M is a metal dopant, have high proton conductivity at elevated temperatures. Although these compounds are mixed ionic/electronic conductors, their electronic conductivity is so low relative to the ionic conductivity that they have not been useful in pressure driven type membrane devices.

More recently, Wachsman et al., in U.S. Pat. Nos. 6,235,417 and 6,296,687, claim that with appropriate substitutions in the perovskite $BaCe_{1-x}M_xO_3$ on the "M" site the electronic conductivity could be enhanced appreciably. By substitution of the proper multivalent transition metal and lanthanide cations the electronic conductivity improved to the point where hydrogen fluxes through the mixed conducting membrane were comparable to the $O_2$ flux achieved through the analogous mixed conducting oxygen ion membranes based on $La_{1-y}Sr_yCo_{1-x}M_xO_3$. Wachsman et al., however, has not resulted in an economically feasible process for purifying hydrogen from gas streams. Other problems remain that have prevented commercialization, namely, the hydrogen flux rates are still not sufficient to produce a commercially viable device and the membranes have not been shown to have adequate thermochemical stability in the syngas environment.

While alternate dopants have resulted in an increase in the electronic conductivity, the increase in electronic conductivity is insufficient for the membrane to function effectively as a pressure-driven hydrogen separation membrane. Alternatively, if a two-phase composite can be fabricated wherein an electronically conducting phase and a protonic conducting phase form interpenetrating networks within a dense ceramic, it may be possible to independently control the fluxes of protons and electrons. Argonne National Laboratory (ANL) is developing dense ceramic/metal composites to fabricate mixed conducting membranes for hydrogen separation. [J. Guan et al., "Development of Mixed-Conducting Ceramic Membranes for Hydrogen Separation," Ceramic Transactions 92 1-12 (1998) and R. V. Siriwardane et al. "Characterization of Ceramic Hydrogen Separation Membranes with Varying Nickel Concentrations," Applied Surface Science 167 [1] 34-50 (2000)]. The ANL group has reported hydrogen fluxes as high as 15 $cc/cm^2/min$ when the metallic phase is also a hydrogen conductor, i.e. palladium. However, Pd-based cermets are not good options for $H_2$ separation from syngas as Pd is significantly poisoned by hydrocarbons at high temperature. With a non-hydrogen conducting protonic phase, the best fluxes published by the ANL group is below 1 $cc/cm^2/min$. Further, the selection of an appropriate metallic second phase with thermochemical and thermomechanical stability is also a concern. Most metals are embrittled by $H_2$ or corroded by the trace components in syngas at elevated temperatures. Relatively inert metals such as platinum and gold have thermal compatibility issues with the protonic conducting phase due to thermal expansion mismatch. In addition, metals are generally soft at the elevated temperatures, which make the puncturing of very thin membranes of the order of 20 μm very likely. Therefore, while the use of cermets for pressure-driven $H_2$ separation remains an interesting possibility, further technological advances are required to make it a viable technology.

SUMMARY OF INVENTION

The present invention is a two-phase all-ceramic composite membrane for pressure driven hydrogen separation from syngas or other mixtures of hydrogen and secondary gases. One of the phases is a proton-conducting ceramic phase and the second phase is an electronically conductive ceramic phase. The all-ceramic membrane offers significant advantages in thermomechanical and thermochemical stability over competing membrane technologies such as ceramic/metal composites.

According to a particular aspect, a mixed protonic/electronic conducting ceramic membrane is provided that is capable of operating at elevated temperatures as high as 1000° C. In addition, the mixed conducting properties are properly balanced so that a sufficient hydrogen flux can be obtained in a pressure driven device such that an economically viable system can be constructed.

According to another aspect, a mixed protonic/electronic conducting ceramic membrane is provided that is chemically and mechanically stable in the high temperature reducing environment typical of syngas or similar fossil fuel generated gas stream from which a high purity hydrogen gas can be separated.

According to yet another aspect, a perovskite type compound is stabilized in high temperature environments containing $CO_2$ and $H_2O$ by additions of cerium oxide based compounds in the ceramic composite which functions to shift the equilibrium reactions of the chemical constituents present towards the reactant side of the equilibrium reaction thereby maintaining the perovskite composition.

According to yet another aspect, the chemical composition of a perovskite phase is modified by removing some of the Barium (or Strontium) resulting in a non-stoichiometric perovskite phase thereby minimizing the chemical reaction between Barium (or Strontium) and $CO_2$ which is a common problem observed with Barium Cerate and Strontium Cerate in syngas type environments.

DETAILED DESCRIPTION

Figure 1:
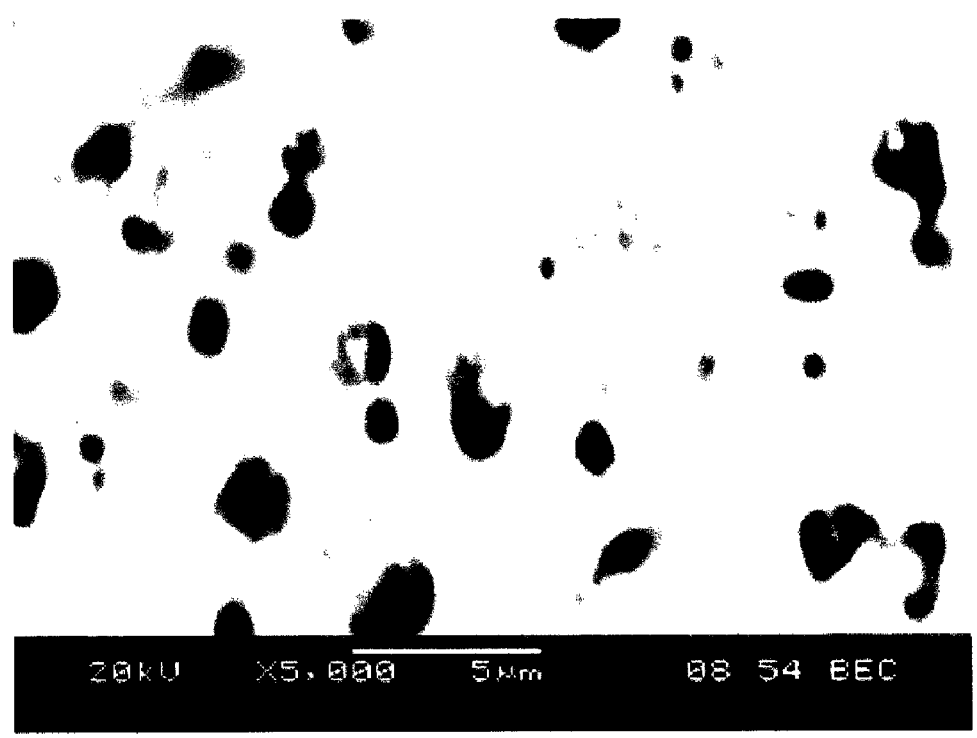
FIG. 1 is a SEM Micrograph showing two-phase composite of a proton-conducting perovskite phase.

While this invention is capable of embodiment in many different forms, there is shown in the drawings and will herein be described in detail, several specific embodiments with the understanding that the present disclosure is to be considered as an exemplification of the principles of the invention and is not intended to limit the invention to the embodiments so illustrated.

The basic features that are required to achieve a mixed conducting membrane material are a proton conducting ceramic phase and an electron conducting ceramic phase. Other ceramic phases may be added as required to improve protonic conductivity, electronic conductivity or chemical stability.

The proton conducting ceramic phase could be a doped perovskite of the general composition $A_{1-x-\alpha}P_xB_{1-y}Q_yO_{3-\delta}$. A is a bivalent cation such as barium (Ba), strontium (Sr), calcium (Ca) or magnesium (Mg) and combinations thereof, P is an A-site dopant, which may be a cation such as Pr, Sm, Er or other cations belonging to the lanthanide series. B is a tetravalent cation which may be either an element in Group IV of the period table (e.g. Ti, Zr) or an element in the lanthanide series of the periodic table (e.g. Ce, La). Q is a B-site dopant which may be either an element in Group III of the period table (e.g. Sc, Y) or an another element (other than B) in the lanthanide series of the periodic table (e.g. Eu, Nd, Gd, Yb). α represents the A-site non-stochiometry (deficiency). Preferred embodiments of the invention would include compounds with specific combination of elements on the A and B sites represented by the chemical formulas $Ba_{1-x-\epsilon}P_xCe_{1-y}Q_yO_{3-\delta}$, $Sr_{1-x-\epsilon}P_xCe_{1-y}Q_yO_{3-\delta}$, and $Ca_{1-x-\epsilon}P_xTi_{1-y}Q_yO_{3-\delta}$. Other preferred embodiments would include an A-site deficiency ε, where $0 \leq \alpha \leq 0.1$. It is to be specifically noted here that P and Q may represent more than one element of the type specified above, and addition of more than one dopant at the A and B site fall within the scope of this invention.

In another embodiment of the present invention, the proton conducting ceramic phase in the multi-phase ceramic may be a complex perovskite. The complex perovskite could be of the types $A_2(B'_{1+\beta}B''_{1-\beta})O_{6-\lambda}$ or $A_3(B'_{1+\beta}B''_{2-\phi})O_{9-\lambda}$, in which A ions are always bivalent (e.g. Ba, Sr, Ca, La), B' ions are trivalent (Eg. Y, Ga, Sc, In, Yb, Nd) or tetravalent (e.g. Zr, Ti, Ce), and B" ions are pentavalent (e.g. Bi, Nb). Generally, $0 \leq \beta \leq 0.2$ and $0 \leq \phi \leq 0.2$.

In yet another embodiment of the present invention, the proton conducting ceramic phase in the multi-phase ceramic could be a pyrochlore structure $(A'_{2-y}A''_y)_2(B_{2-\eta}R)O_{7-\lambda}$ where A' is a bivalent cation (e.g. La), A" is another bivalent cation, B is a tetravalent cation (e.g. Zr, Ce) and R is a bivalent cation (e.g. Ca). In a preferred embodiment, A" and R would be the same cation.

In a preferred embodiment of the present invention, the electronically conducting ceramic phase will also be a product of the reaction between a corrosive gas species and the protonically conducting phase. For example when $CO_2$ or $H_2O$ react with Ba or Sr-containing perovskites, one of the byproducts is cerium oxide ($CeO_2$). It is also known that doped $CeO_2$ is a good electronic conductor under reducing envrionment. The incorporation of doped $CeO_2$ above the percolation limit not only results in sufficient electronic conductivity to make the material and excellent mixed conductor, but also will improve the thermodynamic stability of the composite material in the presence of $CO_2$ or $H_2O$ over perovskite materials where no doped $CeO_2$ is added. It is beneficial to have the dopant in ceria be the same as the dopant in the perovskite phase.

In another embodiment of the present invention, a secondary ceramic phase such as ceria may be added below the percolation limit only to improve the thermodynamic stability, and one or more other electronically conductive ceramic phases may be added to provide the electronic conductivity. Such phases could include semiconducting materials such as tin oxide ($SnO_2$), tungsten oxide ($WO_3$) or silicon carbide (SiC).

The principles of the present invention are demonstrated by the following examples of fabricating the mixed conducting ceramic composite material.

EXAMPLE 1

A stoichiometric pervoskite material was prepared by adding raw material oxide and carbonate powders ($BaCO_3$, $CeO_2$, $Eu_2O_3$) in stoichiometric amounts to form the pervoskite $BaCe_{0.8}Eu_{0.2}O_{2.9}$. The powders were mixed for 30 minutes on a paint shaker with zirconia milling media in a 1 liter Nalgene bottle followed by ball milling for 24 hours. The well mixed powder was then calcined at 1400° C. to decompose the carbonate and react the powders together to form a single phase pervoskite material. The calcined powder was then ball milled for 72 hrs in acetone resulting in a fine powder with a 1-2 micron particle size with a surface area from 1.5-3 $m^2/g$.

The powder was screened through an 80 mesh sieve and then mixed with ceria doped europium that was fabricated by a similar process as the $BaCe_{0.8}Eu_{0.2}O_{2.9}$ to form a 50/50 volume % mixture. The two powders were placed in a Nalgene container with milling media and acetone and then mixed vigorously on a paint shaker for 30 minutes. This mixture was then dried for 12 hours and then screened through an 80 mesh sieve to ensure that the individual powders were well mixed and that there were no large agglomerates from the milling and drying steps. The screened mixture of powders is then placed in a drying oven at 80-90° C. for 24 hours to ensure that the powder is dry.

The dry powder was then ready for fabrication into a ceramic membrane using a variety of ceramic processing techniques such as tape casting, dry pressing or slip casting. In this example the powder was mixed with a 2 wt. % PVB binder solution and acetone and mixed again with milling media on a paint shaker. After mixing the slurry was dried and the binder/powder was then used to fill a 1 inch pellet die followed by dry pressing at 10,000 psi and finally isostatically pressing the pellet at 25,000 psi. The pressed pellet was then sintered at 1550° C. for 2 hours. The sintered pellet was then analyzed by XRD to verify the formation of the two desired phases. It was found that the Barium Cerate and doped Ceria were indeed the two phases present. Finally, the sample was prepared for SEM analysis. FIG. 1 shows the microstructure of the sintered two-phase composite material. More specifically, FIG. 1 is a backscattered SEM micrograph of two-phase composite of a perovskite (grey phase) and doped ceria (bright phase). The pores in the structure, the very dark areas, are completely closed and do not allow gas flow across the membrane.

EXAMPLE 2

Figure 2:
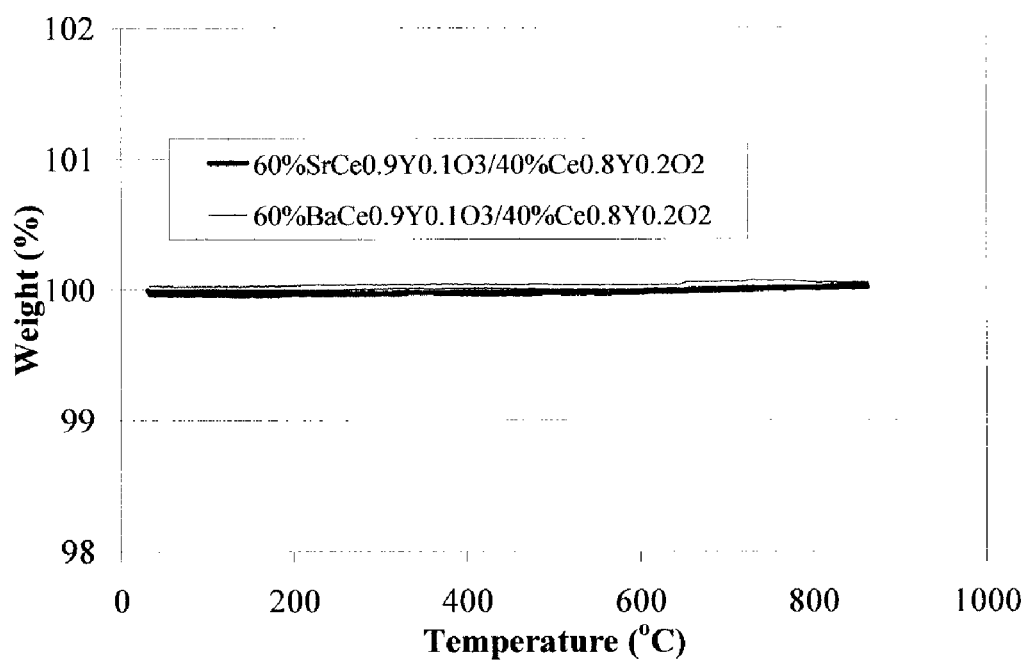
FIG. 2 is a graph of a thermogravimetric analysis in syngas environments showing no weight gain of two phase composite material in syngas.

Two different compositions of the two-phase mixed conducting ceramic material were fabricated as described in example 1. The two compositions formulated were (1) 50 vol % $BaCe_{0.7}Eu_{0.3}O_{2.85}$+50 vol % $Ce_{0.8}Y_{0.2}O_{2.9}$ and (2) 50 vol % $BaCe_{0.8}Eu_{0.2}O_{2.9}$+50 vol % $Ce_{0.8}Y_{0.2}O_{2.9}$. In order to demonstrate the stability of the two phase composite material, thermogravimetric analysis (TGA) in reducing environments containing $H_2O$ and $CO_2$ was performed to observe any weight changes as a function of time. There was no measurable weight change during the TGA tests as shown in FIG. 2 indicating that the material was stable at these temperature and gas composition environments. FIG. 2 depicts thermogravimetric analysis data in syngas showing very good stability of perovskite/oxide composites in reducing environments containing CO, $CO_2$ and $H_2O$.

EXAMPLE 3

A non-stoichiometric pervoskite material was prepared by adding raw material oxide and carbonate powders ($BaCO_3$, $CeO_2$, $Eu_2O_3$) in non-stoichiometric amounts (Barium deficient) to form the pervoskite $Ba_{0.92}Ce_{0.8}Eu_{0.2}O_{2.82}$. The powders were mixed for 30 minutes on a paint shaker with zirconia milling media in a 1 liter Nalgene bottle followed by ball milling for 24 hours. The well mixed powder was then calcined at 1400° C. to decompose the carbonate and react the powders together to form a single phase pervoskite material. The calcined powder was then ball milled for 72 hrs in acetone resulting in a fine powder with a 1-2 micron particle size with a surface area from 1.5-3 $m^2/g$.

Figure 3:
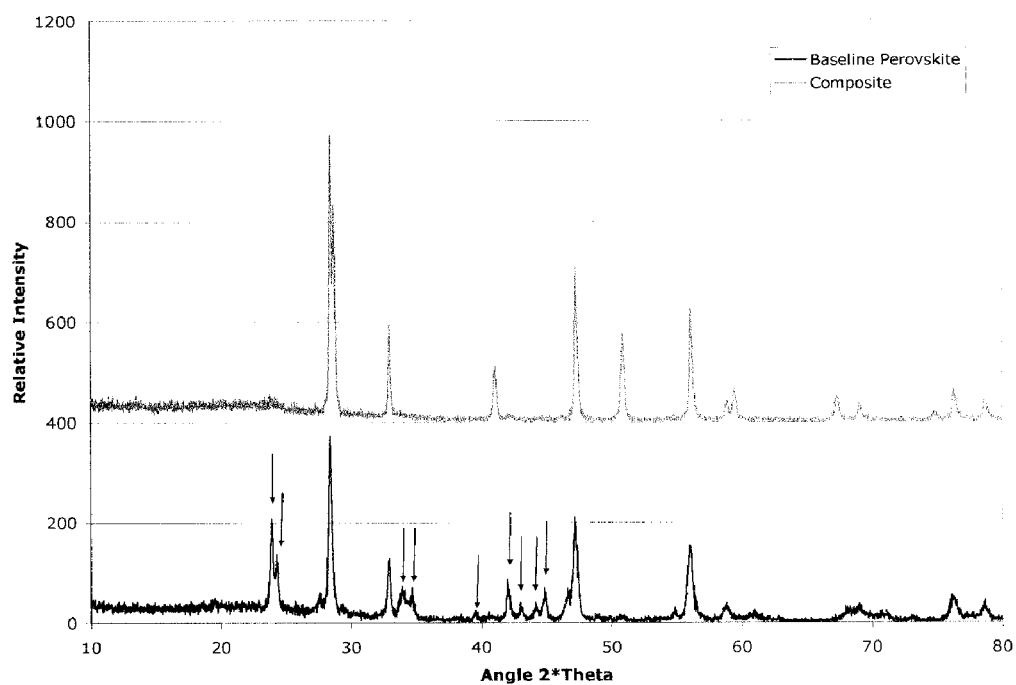
FIG. 3 is a graph of an X-ray analysis showing no significant carbonate formation in the new composite material.

It is well known that conventional doped barium cerate compositions are unstable in oxidizing conditions in the presence of $CO_2$ and $H_2O$ due to hydroxide and carbonate formation respectively. An experiment was performed to demonstrate that the materials in the present invention are more stable than perovskite materials alone that are commonly used as mixed conducting membranes. In this experiment X-ray diffraction studies were performed on powder exposed to simulated syngas at high-temperature. The high-temperature exposure tests in simulated syngas showed no noticeable carbonate formation occurring in non-stoichiometric composite samples while baseline perovskite samples that were also non-stoichiometric were completely reacted as shown in FIG. 3. FIG. 3 depicts X-ray diffraction analysis data for powders exposed to syngas at 900° C. showing very little carbonate formation in the non-stoichiometric perovskite/oxide composite compared with the baseline non-stoichiometric perovskite exposed to identical conditions. The arrows in FIG. 3 indicate locations of the primary barium carbonate peaks.

EXAMPLE 4

Figure 4:
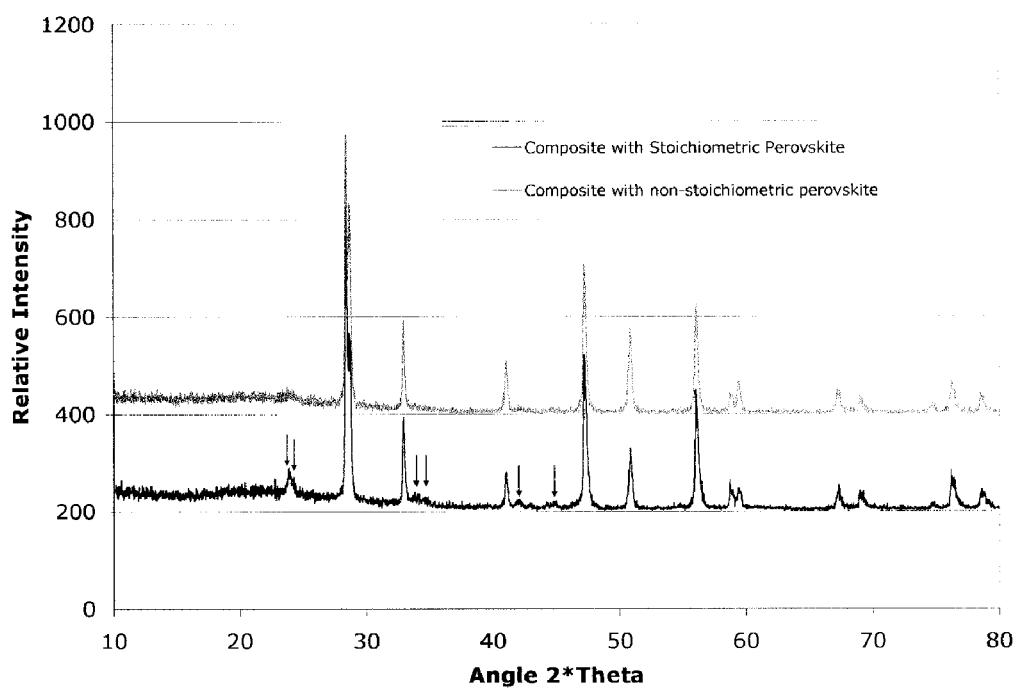
FIG. 4 is a graph of an X-ray analysis showing stability of non-stoichiometric composite material versus non-stoichiometric single phase perovskite in syngas at 900° C.

A stoichiometric perovskite/doped ceria composite was fabricated as described in example 1 and a non-stoichiometric pervoskite/doped ceria composite material was prepared as described in example 3. These two sample materials were used to compare the stability of the two materials in a syngas environment at 900° C. FIG. 4 shows a comparison of x-ray differection pattern of composite powders with stoichiometric and non-stoichiometric perovskite phases. More specifically, FIG. 4 shows X-ray diffraction analysis data for powders exposed to syngas at 900° C. showing very little carbonate formation in the non-stoichometric perovskite/oxide composite powder compared with the stochiometric perovskite/oxide composite powder exposed to identical conditions. The arrows in FIG. 4 indicate locations of the primary barium carbonate peaks. The composite with the non-stoichiometric A-site deficient perovskite had 50% by volume of $Ba_{0.92}Ce_{0.8}Eu_{0.2}O_{2.82}$ 50% by volume of $Ce_{0.8}Eu_{0.2}O_{2.9}$, and the composite with the stoichiometric perovskite composition had 50% by volume of $BaCe_{0.8}Eu_{0.2}O_{2.9}$ 50% by volume of $Ce_{0.8}Eu_{0.2}O_{2.9}$. The composite with the barium deficient composition shows improved chemical stability in syngas due to significantly lower carbonate formation, due to the lower activity of the A-site cations (i.e., $Ba^{2+}$ ions in the example given) in the non-stoichiometric composition.

EXAMPLE 5

Two phase composite ceramic powders were prepared as described in example 1. These powders were then used to prepare slips for tape casting in order to fabricate a thin membrane mixed conductor that is supported on a porous substrate. The slip for the dense component was cast into 2 thicknesses, 8 mil and 1 mil. while the porous slip is only cast at 8 mil. The tape casts are dried using standard ceramic processing procedures and shapes are punched out of the separate tapes to shapes and sizes that are predetermined to maximize the exposed surface area of the thin layer of the membrane in the membrane package. Once the initial dimensions of the membrane were punched out the pieces were cut using a laser cutter to obtain the necessary features to maximize the surface area of the membrane and to also give the membrane support. Once laser cutting was finished the pieces were then laminated together using standard ceramic processing procedures to form the membrane package with substrate and membrane support.

After the membrane package was laminated it was fired to 1550° C. to burn out the pore former from the porous layer of the membrane package and to sinter the laminated layers into a continuous single structure that consisted of both the pervoskite and the ceria doped with europium.

The sintered membrane package was then sealed into a stainless steel cup with a glass or cement that has a similar coefficient of thermal expansion to that of the composite pervoskite and stainless steel. The stainless steel cup was designed and machined to support the membrane package and allow for a sweep gas on the permeate side of the membrane.

The testing apparatus was setup in a reforming catalyst reactor to accommodate various molar fractions in the syngas due to changing the volumetric feeds of hydrogen, methane, water, carbon dioxide, and carbon monoxide. The membrane that was sealed to the stainless steel cup was placed down stream of the catalyst in the reactor and heated to a temperature of 900° C. Helium was used as a sweep gas on the permeate side of the membrane to carry away the hydrogen to a zirconia oxygen sensor to determine the amount of hydrogen flux obtained. The zirconia oxygen sensor was calibrated by varying the concentrations of hydrogen and helium and measuring the voltage across the cell due to the different concentrations of hydrogen in the stream. While the test was running with syngas the voltage of the zirconia oxygen sensor was recorded and then used to determine the concentration of hydrogen in the carrier gas. This information was then used to calculate the flux through the membrane.

Figure 5:
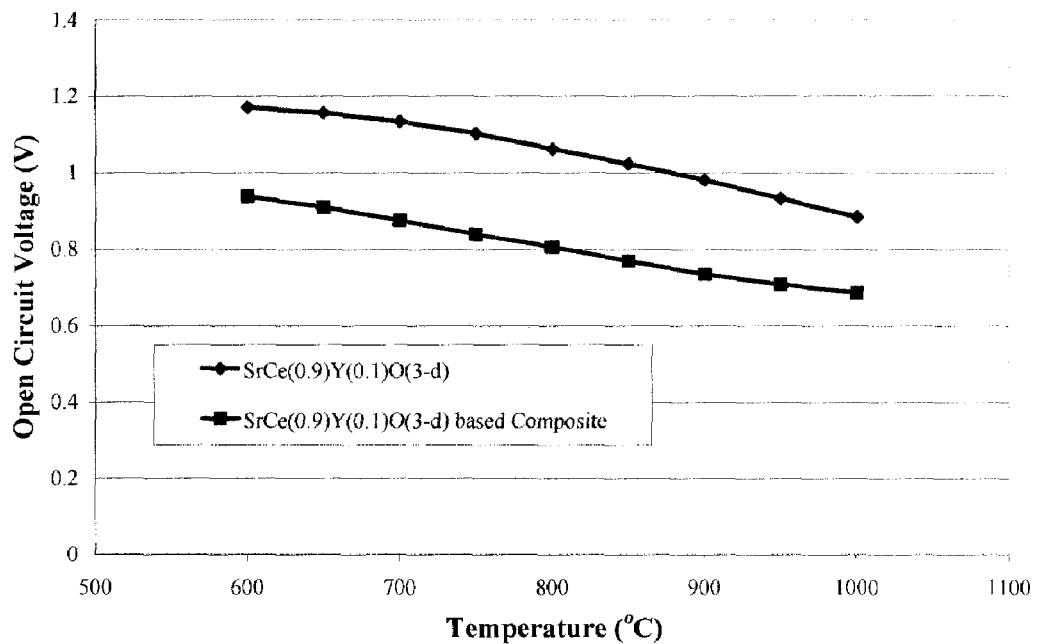
FIG. 5 is a graph of open circuit voltage measurements showing mixed conducting behavior of composite membranes.
Figure 6:
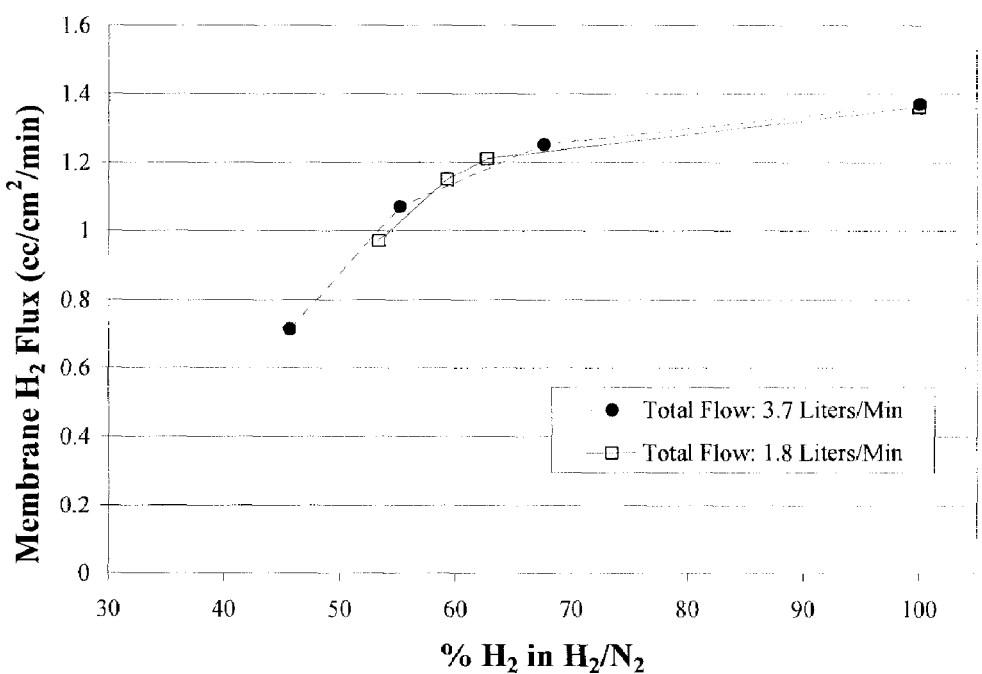
FIG. 6 is a graph demonstrating hydrogen separation driven by a hydrogen partial pressure gradient through a composite membrane.

FIG. 5 shows the open circuit voltage across the composite membrane. More specifically, FIG. 5 shows the lowering of Open Circuit Voltage (OCV) in a perovskite/doped-ceria composite showing mixed ionic-electronic conducting behavior. In order to demonstrate the feasibility of pressure-driven hydrogen separation from syngas using the new composite materials, we performed partial pressure/concentration driven $H_2$ separation separation experiments using hydrogen/nitrogen mixtures. The experiments were performed using thick membranes (500 μm thickness). FIG. 6 shows the hydrogen flux obtained through a 500 μm thick dense perovskite/oxide composite membrane tested at two feed gas flow-rates to demonstrate that there were no leaks in the system. While the flux obtained (shown in FIG. 6) is relatively low (<1.4 cc/cm$^2$/min) due to the very thick (500 μm) membranes, used, the experiment demonstrated that concentration/pressure driven hydrogen separation is feasible through these dense perovskite/oxide composite membranes.

The invention claimed is:

1. A multi-phase ceramic composite material comprising:
a proton conducting ceramic phase having a protonic conductivity greater than about $1.0 \times 10^{-3}$ S/cm at an operating temperature; and
an electron conducting ceramic phase with electronic conductivity greater than $1.0 \times 10^{-2}$ S/cm when measured under reducing conditions with an oxygen partial pressure less than about 0.05 atm, wherein the amount of said electron conducting ceramic phase is above its percolation limit in the composite material; and
wherein the material is gas impermeable when sintered.

2. The material in accordance with claim 1, wherein the electron conducting ceramic phase is structurally and chemically identical to at least one product of a reaction between the proton conducting phase and at least one expected gas under operating conditions of a membrane fabricated using the material.

3. The material in accordance with claim 2, wherein the electron conducting ceramic phase has a form $Ce_{1-x}B_xO_{2-\epsilon}$, wherein B is selected from the group consisting of yttrium and an element belonging to the Lanthanide series in the periodic table, x is between about 0 and about 0.75, and $\epsilon$ is an oxygen deficiency.

4. The material in accordance with claim 3, wherein x is between about 0.2 and about 0.3.

5. The material in accordance with claim 1, wherein the electron conducting ceramic phase has a form $Ce_{1-x}B_xO_{2-\epsilon}$, wherein B is selected from the group consisting of yttrium and an element belonging to the Lanthanide series in the periodic table, x is between about 0 and about 0.75, and $\epsilon$ is an oxygen deficiency.

6. The material in accordance in accordance with claim 5, wherein x is between about 0.2 and about 0.3.

7. The material in accordance with claim 1, wherein the proton conducting ceramic phase has a perovskite structure.

8. The material in accordance with claim 7, wherein the electron conducting phase comprises a ceria.

9. The material in accordance with claim 7, wherein the electron conducting phase comprises a doped ceria.

10. The material in accordance with claim 7, wherein the perovskite has a form $A_{1-x-\alpha}P_xB_{1-y}Q_yO_{3-\delta}$; wherein A is a bivalent cation selected from the group consisting of barium (Ba), strontium (Sr), calcium (Ca) and magnesium (Mg) and combinations thereof; wherein P is an A-site dopant that is a cation; wherein B is a tetravalent cation selected from the group consisting of an element in Group IV of the period table and an element in the lanthanide series of the periodic table; wherein Q is a B-site dopant selected from the group consisting of an element in Group III of the period table and an element in the lanthanide series of the periodic table; and wherein $\alpha$ is between about 0 and about 0.1, x is between about 0 and about 0.5, and y is between about 0 and about 0.3, $\alpha$ is a non-stoichiometric A-site deficiency, and $\delta$ is an oxygen deficiency.

11. The material according to claim 10, wherein the A-site dopant is a cation selected from the group consisting of Pr, Sm, Er and element in the lanthanide series of the periodic table.

12. The material in accordance with claim 10, wherein $\alpha$ is a non-stoichiometric A-site deficiency.

13. The material in accordance with claim 10, wherein $\delta$ is an oxygen deficiency.

14. The material in accordance with claim 1, where the proton conducting ceramic phase is a complex perovskite.

15. The material in accordance with claim 1, further comprising a secondary ceramic phase added below a percolation limit to improve thermodynamic stability.

16. The material in accordance with claim 1, further comprising a second electronically conducting phase selected from the group consisting of tin oxide ($SnO_2$), doped $SnO_2$, tungsten oxide ($WO_3$), doped $WO_3$, cobalt oxide ($CoO_3$), doped $CoO_3$ and silicon carbide (SiC).

17. The material in accordance with claim 1, wherein the amount of the electron conducting ceramic phase is at least the percolation limit of the electron conducting ceramic phase in the material.

18. The material in accordance with claim 1, wherein the amount of the electron conducting ceramic phase is about 50% by volume of the material.

19. The material in accordance with claim 1, further comprising an amount of electron conducting ceramic phase sufficient to prevent the formation of carbonate when the material is in the presence of carbon dioxide.

20. The material in accordance with claim 1, further comprising an amount of the electron conducting ceramic phase sufficient to prevent the formation of hydroxide when the material is in the presence of water.

21. The material in accordance with claim 1, wherein the proton conducting phase and the electron conducting phase are present in the material in sufficient quantities such that the material is impermeable to gas when sintered.

22. The material in accordance with claim 1, wherein the proton conducting ceramic phase has a pyrochlore structure of $(A'_{2-y}A''_y)_2(B_{2-\eta}R_\eta)O_{7-\lambda}$ wherein A' is a trivalent cation, A" is a divalent cation, B is a tetravalent cation and R is a divalent cation.

23. The material in accordance with claim 22, wherein A" and R are identical cations.

24. The material in accordance with claim 22, wherein $0 \leq y \leq 0.3$.

25. The material in accordance with claim 22, wherein $0 \leq \eta \leq 0.3$.

26. The material in accordance with claim 1, wherein the complex perovskite has a structure of $A_2(B'_{1+\beta}B''_{1-\beta})O_{6-\lambda}$, wherein A is a divalent ion, B' is one a trivalent ion and a tetravalent ion, and B" is a pentavalent ion.

27. The material in accordance with claim 26, wherein $0 \leq \beta \leq 0.3$.

28. The material in accordance with claim 26, wherein $0 \leq \phi \leq 0.2$.

29. The material in accordance with claim 1, wherein the complex perovskite has a structure $A_3(B'_{1+\phi}B''_{2-\phi})O_{9-\lambda}$, wherein A is a divalent ion, B' is one of a trivalent ion and a tetravalent ion, and B" is a pentavalent ion.

30. The material in accordance with claim 29, wherein $0 \leq \beta \leq 0.3$.

31. The material in accordance with claim 29, wherein $0 \leq \phi \leq 0.2$.

32. A multi-phase ceramic composite material comprising:
a proton conducting ceramic phase having a protonic conductivity greater than $1.0 \times 10^{-3}$ S/cm at an operating temperature; and
an electron conducting a ceramic phase with electronic conductivity greater than $1.0 \times 10^{-2}$ S/cm when measure under reducing conditions with an oxygen partial pressure less than 0.05 atm, said electron conducting ceramic phase forming at least one contiguous path between opposing ends of the material such that electrons may pass through the material;
wherein the material is gas impermeable when sintered.

33. The material in accordance with claim 32, wherein the electron conducting ceramic phase is structurally and chemically identical to at least one product of a reaction between the proton conducting phase and at least one expected gas under operating conditions of a membrane fabricated using the material.

34. The material in accordance with claim 33, wherein the electron conducting ceramic phase has a form $Ce_{1-x}B_xO_{2-\epsilon}$, wherein B is selected from the group consisting of yttrium and an element belonging to the Lanthanide series in the periodic table, x is between about 0 and about 0.75, and $\epsilon$ is an oxygen deficiency.

35. The material in accordance with claim 34, wherein x is between about 0.2 and about 0.3.

36. The material in accordance with claim 32, wherein the electron conducting ceramic phase has a form $Ce_{1-x}B_xO_{2-x}$, wherein B is selected from the group consisting of yttrium and an element belonging to the Lanthanide series in the periodic table, x is between about 0 and about 0.75 and $\epsilon$ is an oxygen deficiency.

37. The material in accordance claim 36, wherein x is between about 0.2 and about 0.3.

38. The material in accordance with claim 32, wherein the proton conducting ceramic phase has a perovskite structure.

39. The material in accordance with claim 38, wherein the electron conducting phase comprises a ceria.

40. The material in accordance with claim 38, wherein the electron conducting phase comprises a doped ceria.

41. The material in accordance with claim 38, wherein the perovskite has a form $A_{1-x-\alpha}P_xB_{1-y}Q_yO_{3-\delta}$; wherein A is a bivalent cation selected from the group consisting of barium (Ba), strontium (Sr), calcium (Ca) and magnesium (Mg) and combinations thereof; wherein P is an A-site dopant that is a cation; wherein B is a tetravalent cation selected from the group consisting of an element in Group IV of the period table and an element in the lanthanide series of the periodic table; wherein Q is a B-site dopant selected from the group consisting of an element in Group III of the period table and an element in the lanthanide series of the periodic table; and wherein α is between about 0 and about 0.1, x is between about 0 and about 0.5, and y is between about 0 and about 0.3, α is a non-stoichiometric A-site deficiency, and δ is an oxygen deficiency.

42. The material according to claim 41, wherein the A-site dopant is a cation selected from the group consisting of Pr, Sm, Er and an element in the lanthanide series of the periodic table.

43. The material in accordance with claim 41, wherein α is a non-stoichiometric A-site deficiency.

44. The material in accordance with claim 41, wherein δ is an oxygen deficiency.

45. The material in accordance with claim 32, where the proton conducting ceramic phase is a complex perovskite.

46. The material in accordance with claim 32, further comprising a secondary ceramic phase added below a percolation limit to improve thermodynamic stability.

47. The material in accordance with claim 32, further comprising a second electronically conducting phase selected from the group consisting of tin oxide ($SnO_2$), doped $SnO_2$, tungsten oxide ($WO_3$), doped $WO_3$, cobalt oxide ($CoO_3$), doped $CoO_3$ and silicon carbide (SiC).

48. The material in accordance with claim 32, wherein the amount of the electron conducting ceramic phase is at least the percolation limit of the electron conducting ceramic phase in the material.

49. The material in accordance with claim 32, wherein the amount of the electron conducting ceramic phase is about 50% ha volume of the material.

50. The material in accordance with claim 32, wherein the amount of the electron conducting ceramic phase is sufficient to prevent the formation of carbonate when the material is in the presence of carbon dioxide.

51. The material in accordance with claim 32, wherein the amount of the electron conducting ceramic phase is sufficient to prevent the formation of hydroxide when the material is in the presence water.

52. The material in accordance with claim 32, wherein the proton conducting phase and the electron conducting phase are present in the material in sufficient quantities such that the material is impermeable gas when sintered.

53. A multi-phase ceramic composite material comprising:
a proton conducting ceramic phase having a protonic conductivity greater than $1.0 \times 10^{-3}$ S/cm at an operating temperature;
an electron conducting ceramic phase with electronic conductivity greater than $1.0 \times 10^{-2}$ S/cm when measured under reducing conditions with an oxygen partial pressure less than 0.05 atm and wherein the amount of the electron conducting ceramic phase is sufficient to prevent the formation of carbonate in the presence of carbon dioxide and the formation of hydroxide in the presence of water; and
wherein the material is gas impermeable when sintered.

* * * * *